(12) United States Patent
Bandholz et al.

(10) Patent No.: US 9,727,108 B2
(45) Date of Patent: Aug. 8, 2017

(54) SUPPLY OF POWER FROM ONE DEVICE TO ANOTHER DEVICE

(71) Applicant: Lenovo (Singapore) Pte. Ltd., New Tech Park (SG)

(72) Inventors: Justin Potok Bandholz, Apex, NC (US); Paul Artman, Cary, NC (US)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 146 days.

(21) Appl. No.: 14/657,013

(22) Filed: Mar. 13, 2015

(65) Prior Publication Data

US 2016/0266626 A1    Sep. 15, 2016

(51) Int. Cl.
*G06F 1/26* (2006.01)

(52) U.S. Cl.
CPC .................................. *G06F 1/266* (2013.01)

(58) Field of Classification Search
None
See application file for complete search history.

(56) References Cited

U.S. PATENT DOCUMENTS

| | | | | |
|---|---|---|---|---|
| 5,483,656 A | * | 1/1996 | Oprescu | G06F 1/26 700/297 |
| 5,745,670 A | * | 4/1998 | Linde | H02J 1/14 307/64 |
| 2009/0055665 A1 | * | 2/2009 | Maglione | G06F 1/206 713/320 |
| 2011/0266867 A1 | * | 11/2011 | Schindler | G06F 1/266 307/24 |
| 2011/0320826 A1 | * | 12/2011 | Simmons | G06F 1/26 713/300 |
| 2013/0318371 A1 | * | 11/2013 | Hormuth | G06F 1/28 713/320 |

* cited by examiner

*Primary Examiner* — Paul Yanchus, III
(74) *Attorney, Agent, or Firm* — John L. Rogitz; John M. Rogitz

(57) ABSTRACT

In one aspect, a device includes at least one processor, storage, a power supply unit (PSU) interlace which connects to a PSU and receives power from the PSU, and a power module (PM) including a power in interface for receiving power from at least one computer and a power out interface for providing power to at least one computer.

23 Claims, 7 Drawing Sheets

SUPPLY OF POWER FROM ONE DEVICE TO ANOTHER DEVICE

FIELD

The present application relates generally to the supply of power from one device to another device.

BACKGROUND

Servers deployed in a relatively large-scale environment typically receive their power from centralized power sources to reduce component costs, potential failure points, and power conversion losses. However, this model is not desirable for a server(s) deployed in a relatively small-scale environment where e.g. it is desirable to have relatively high availability for the server(s) and power redundancy for the servers). The present application recognizes that there are currently no adequate solutions for providing at least some of the desirable aspects of a large-scale environment at e.g. a relatively smaller-scale level and/or mid-scale level.

SUMMARY

Accordingly, in one aspect a first server includes a baseboard management controller (BMC), at least a first power module (PM) which at least receives at least some power from a second PM on a second server different from the first server, and a circuit which facilitates communication between the first PM and the BMC on the first server. The first PM identifies an assertion, which is associated with a number, from the second PM and communicates the assertion to the circuit. In response to identification of the assertion, the circuit communicates data pertaining to the assertion to the BMC. The BMC, in response to receipt of the data, alters power management of the first server from a first power state to a second power state different from the first power state.

In another aspect, a method includes facilitating connection of a first power module (PM) of a first server to a second PM of second server, where the connection of the first PM to the second PM at least in part establishes the supply of at least backup power from the second PM to the first PM. The method also includes facilitating connection of the first PM to a third PM of a third server, where the connection of the first PM to the third PM at least in past establishes the supply of at least backup power from the first PM to the third PM.

In still another aspect, a device includes at least one processor, storage, a power supply unit (PSU) interface that connects to a PSU and receives power from the PSU, and a power module (PM). The PM includes a power in interface for receiving power from at least one computer and a power out interface for providing power to at least one computer.

In yet another aspect, a server includes a baseboard management controller (BMC), and at least, a first power module (PM) that at least receives at least some power from a second PM on a second server different from the first server. The PM identifies a false assertion and communicates at least data related thereto to the BMC. The BMC, in response to receipt of the data, alters power management of the server from a first power state to a second power state different from the first power state.

The details of present principles, both as to their structure and operation, can best be understood in reference to the accompanying drawings, in which like reference numerals refer to like parts, and in which:

DETAILED DESCRIPTION

Figure 1:
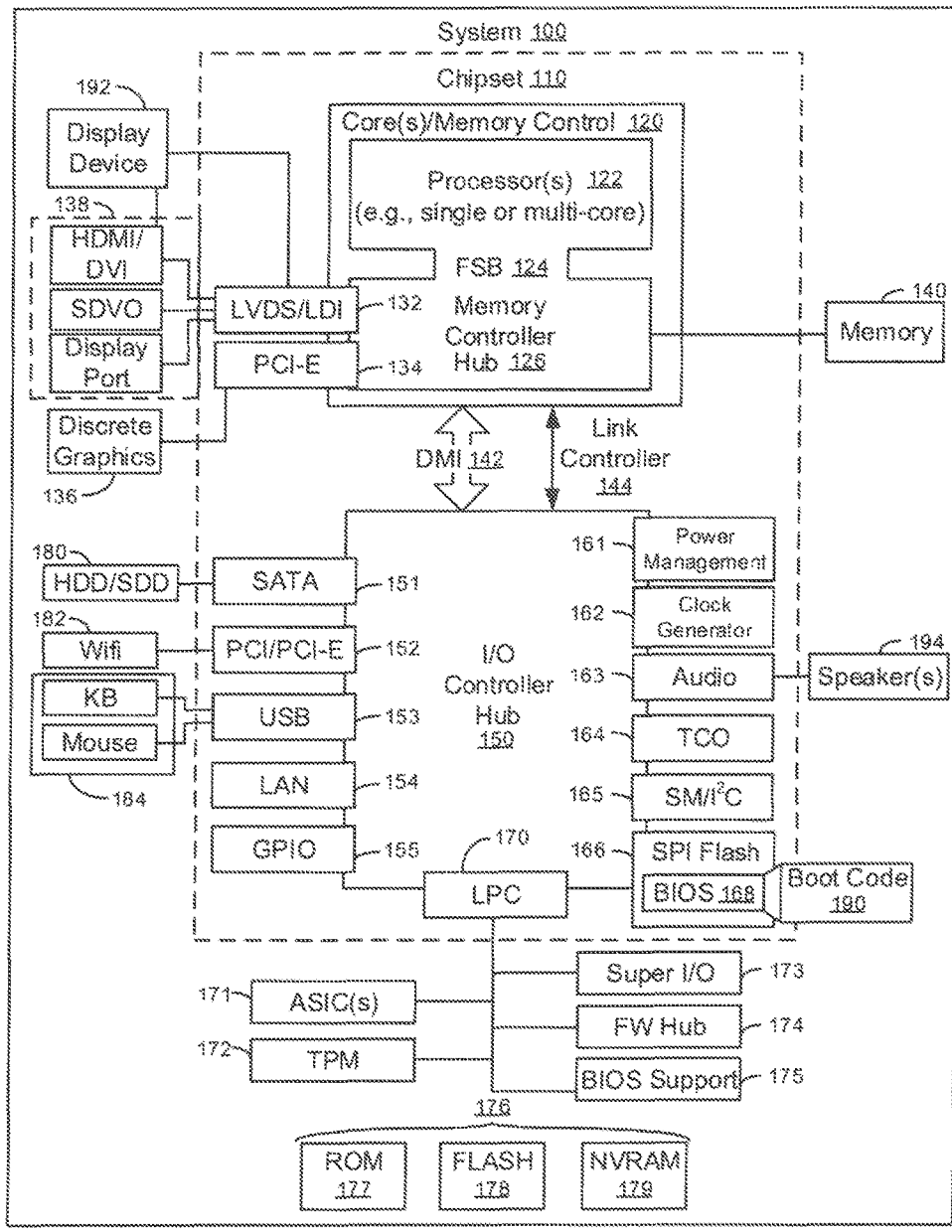
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Maxilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication, connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depleted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or mom of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 maybe e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support, for DDR SDRAM memory (e.g., DDR, DDR2, DDR3, etc.). In general, the memory 140 is a type of random-access memory (RAM). It is often referred to as "system memory."

The memory controller huh 126 further includes a low-voltage differential signaling interface (LVPS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller huh 126 also includes one or more PCI-express interfaces (PCI-E) 134, for example, for support of discrete graphics 136. Discrete graphics using a PCI-E interface has become an alternative approach to an accelerated graphics port (AGP), For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network, interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interlaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the IPC interface 170 provides for use of one or more ASICs 171, a trusted platform module (TPM) 173, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Figure 2:
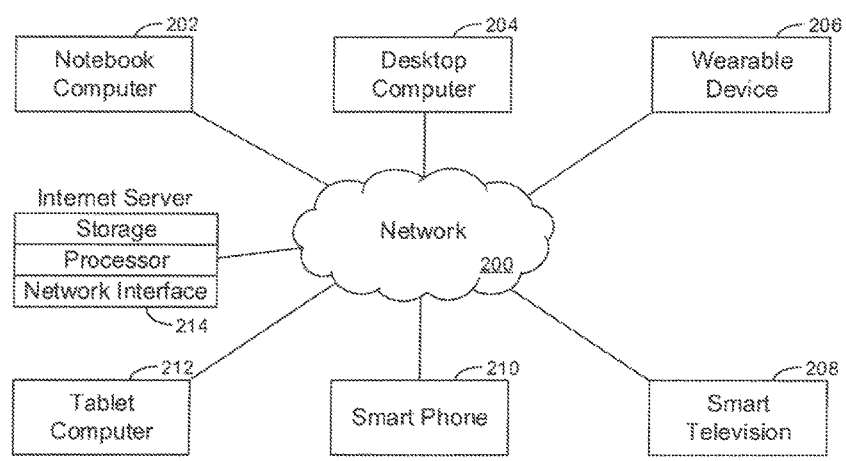
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 such as e.g. an Internet server that may e.g. provide cloud storage accessible to the devices 202-212. It is to be understood that the devices 202-214 are configured to communicate with each other over the network 200 to undertake present principles.

Figure 3:
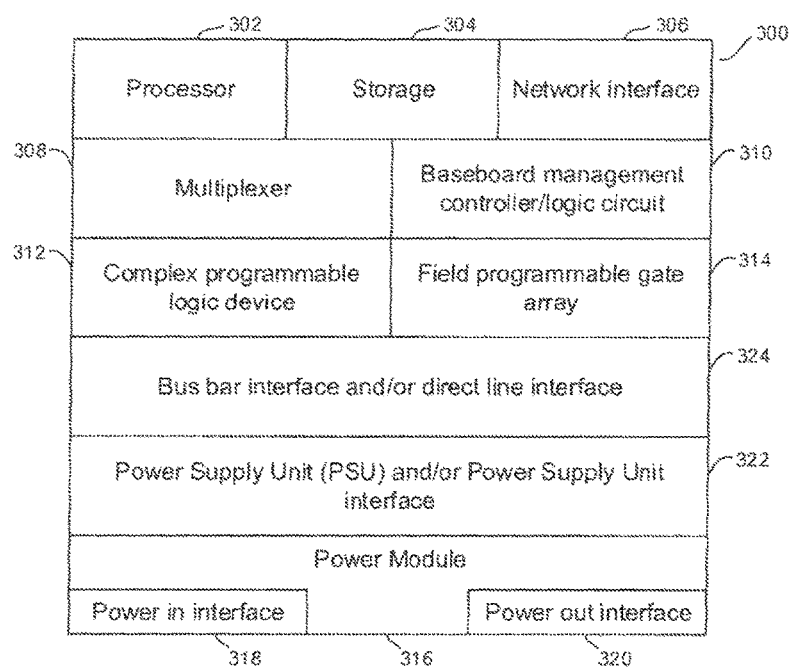
FIG. 3 is a block diagram of an example server in accordance with present principles.

Referring now to FIG. 3, it shows a server 300 which may include some or all of the features discussed above in reference to the system 100, and/or which may be an example of any of the servers discussed below. Thus, the server 300 includes a processor 302, storage 304 (e.g. a hard disk drive), and a network interface 306 for communication over a network such as the Internet. The server 300 also includes a multiplexer 308 for communicating with other servers as discussed further below, as well as at least one baseboard management controller (BMC) and/or logic circuitry 310 for undertaking present principles as discussed further below. Still further, the server 300 includes at least one complex programmable logic device (CPLD) 312 that communicates with the BMC as discussed further below, and/or a field programmable gate array (FPGA) 314 that communicates with the BMC as discussed further below.

In addition to the foregoing, the server 300 of FIG. 3 includes at least one power module (PM) 316 configured for undertaking present principles. The PM 316 may include a power in interface 318 for receiving power from, one or more other PMs on other servers as discussed herein, and a power out interface 320 for providing power to one or more other PMs on other servers as discussed herein. The server 300 also includes at least one power supply unit (PSU) interface and/or direct power line interface 322, which may be integrated with and/or coupled to the PM 316 and/or separately included on the server 300 but nonetheless in at least electrical communication with the PM 316. Note, however, that although not shown, the interface 322 may be integral with a PSU coupled to and/or included on the server 300. Regardless, the interface 322 is understood to be engageable with at least one PSU for receiving power therefrom (e.g. power from a wall outlet when the PSU is connected at one end to the outlet and at the other end to the interface 322).

Still further, it may be appreciated from FIG. 3 that the server 300 also includes a bus bar interface and/or a direct line interface 324, which may also be integral with and/or coupled to the PM 316 and/or separately included on the server 300 but nonetheless in at least electrical communication with the PM 316. The interface 324 is understood to be engageable with either or both of a bus bar providing power (e.g. directly) from another server and/or a direct line (e.g. electrical cable) providing power (e.g. directly) from another server. Thus, in either case, it is to be understood that the interface 324 facilitates receipt of power from another server rather than from e.g. a "rack-level" power source .independent of a server but electrically coupled thereto to provide power to plural servers, and/or independent of a e.g. "rack-lever" power bay that itself is independent of a sewer but electrically coupled thereto to provide power to plural servers.

Figure 4:
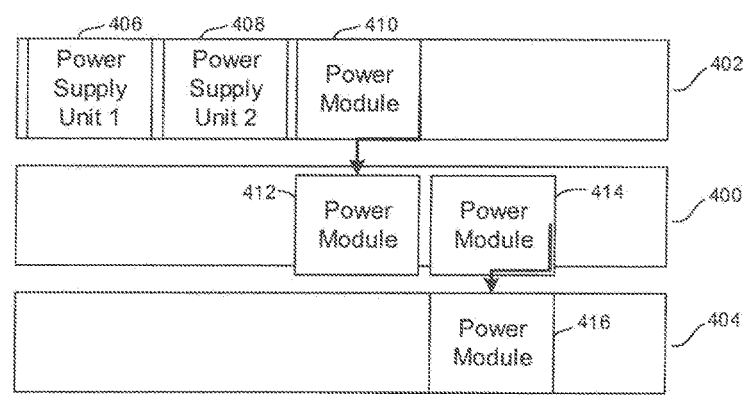
FIGS. 4-6 are block diagrams of example server power sharing embodiments.

Continuing the detailed description in reference to FIG. 4, it is an example block diagram of a first server 400, a second server 402, and a third server 404 which are understood to fee in electrical and informational communication as set forth herein. Note that the second server 402 includes at least a first power supply unit (PSU) 406 and a second PSU 408, as well as at least one power module (PM) 410 to which power is provided from the PSUs 406 and/or 408. The PM 410 communicates (e.g. using PMBUS communication) with at least one PM 412 on the first server 400 and provides power thereto to at least in part power the first server 400 under various conditions (e.g. during a normal operating mode for the server 400, to provide backup power should the first server 400 need it, etc.).

Note that the first server 400 also includes at least one other power module 414 which communicates with at least one PM 416 on the third server 404 and provides power thereto to at least in part power the third server 404. it is to be understood that direct lines (e.g. cable lines running directly from one of the PMs shown to another of the PMs shown in FIG. 4) and/or bus bars routing power (e.g. directly, rather than at the "rack level") from one of the PMs shown to another of the PMs shown may be used to transfer power. Thus, either or both of a direct line and bus bar may be used to provide power from the PM 410 to the PM 412, and to provide power from the PM 414 to the PM 416. It is to be further understood that power may be transferred from the second server 402 to the third server 404 via the first server 400 (e.g. via either or both of the PMs 412 and 414, and/or another PM on the first server 400), and furthermore that the PMs 412 and 414 are in at least electrical communication with each other (and optionally, informational communication). Furthermore, it is to be understood, that although the directional arrows shown represent power going only in one direction from one respective PM to another PM, in some embodiments the path may in fact be bi-directional for power to flow both ways via the direct line(s) and/or bus bar(s) used (e.g. using one line, and/or using respective one-way lines (e.g. input and. output lines relative to one of the PMs, or a directionally switchable line(s))).

It is to be understood that the servers 400-404 when connected via respective PMs as shown in FIG. 4 establish an N+0 embodiment to share power among the servers 400-404. Thus, it is to be understood that the first server 400 and third server 404 may not comprise their own respective PSUs (though in some embodiments they may) but instead receive their power from the PSUs 406 and 408. In at least some embodiments, this example arrangement of two PSUs being used across three servers allows for beneficial load balancing across the servers to allow for relatively higher performance.

Figure 5:
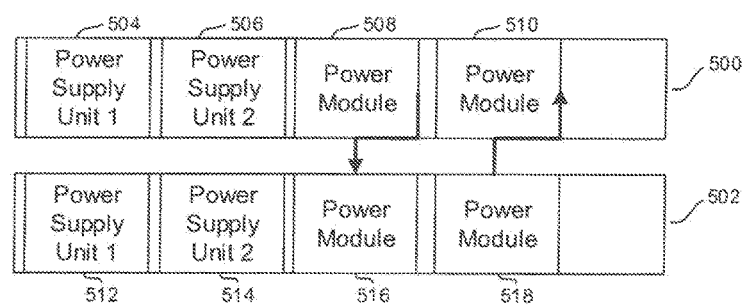

Now in reference to FIG. 5, another example block diagram is shown, this one showing a first server 500 and a second server 502. The first server 500 comprises at least a first PSU 504 and a second PSU 506 in electrical communication (e.g. and optionally, informational communication) with one or both of a first PM 508 and a second PM 510. The second server 502 comprises at least a third PSU 512 and a fourth PSU 514 in electrical communication (e.g. and optionally, informational communication) with one or both of a third PM 516 and fourth PM 518. Note that as represented by the directional arrows shown, the server 500 may provide power to the server 502 via the PM 508 to the PM 516, and the server 502 may provide power to the server 500 via the PM 518 to the PM 510.

It is to be understood that direct lines (e.g. cable lines running directly from one of the PMs shown to another of the PMs shown in FIG. 5) and/or bus bars routing power (e.g. directly, rather than, at the "rack level") from one of the PMs shown to another of the PMs shown may be used to transfer power. Thus, either or both of a direct line and has bar may be used to provide power from the PM 508 to the PM 516, and to provide power from the PM 518 to the PM 510.

It is to be further understood that the PMs 508 and 510 are in at least electrical communication with each other (and optionally, informational communication), and that the PMs 516 and 518 are in at least electrical communication (and optionally, informational communication). Furthermore, it is to be understood that although the directional arrows shown represent power going only in one direction from one respective PM to another PM, in some embodiments the path may in fact be bi-directional for power to flow both ways via the direct line(s) and/or bus bar(s) used (e.g. using one line, and/or using respective one-way lines (e.g. input and output lines relative to one of the PMs, or a directionally switchable line(s))).

Still in reference to FIG. 5, it may be appreciated therefrom that this figure shows an example "fail-over" model which establishes a collective N+1 embodiment where neither server in isolation has N+1 power redundancy, but does when in electrical communication with the other respective server.

Figure 6:
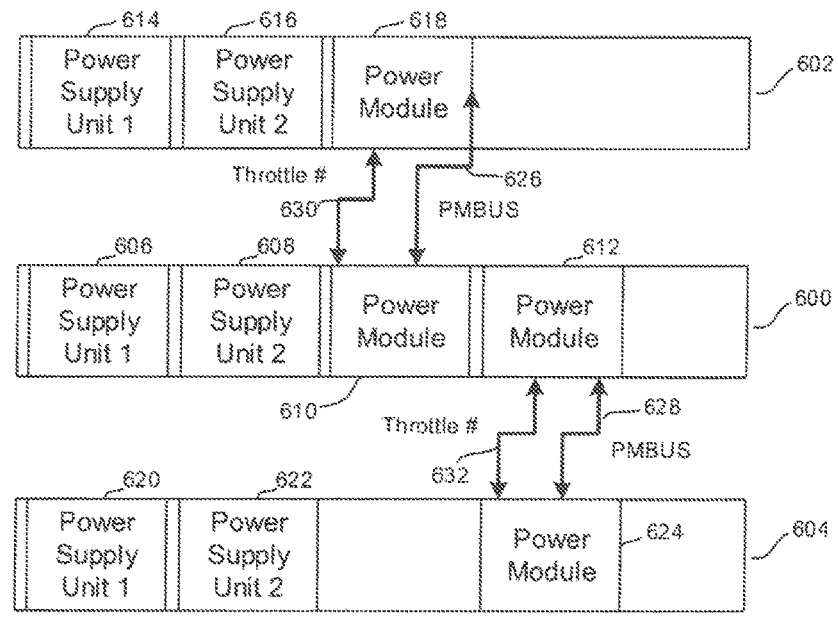

Moving on, reference is now made to FIG. 6, which is an example block-diagram of a first server 600, a second server 602, and a third server 604 which are understood to be in electrical and informational communication with each other. Note that the first server 600 includes at least a first PSU 606 and a second PSU 608, as well as at least a first PM 610 and a second PM 612 to which power is provided from the PSUs 606 and/or 608. The second server 602 includes at least a third PSU 614 and a fourth PSU 616, as well as at least a third PM 618 to which power is provided from the PSUs 614 and/or 616. The third server 604 includes at least a fifth PSU 620 and a sixth PSU 622, as well as at least a fourth PM 624 to which power is provided from the PSUs 620 and/or 622.

It is to be understood that the PMs 610, 612, 618, and 624 may communicate with each other (e.g. using PMBUS communication as represented by respective bidirectional arrows 626 and 628, and by transmitting at least one predefined number and/or identifier as discussed further below, such as a throttle pin, as represented by respective bidirectional arrows 630 and 632) and exchange power either directly and/or, in the case of power being exchanged between the servers 602 and 604, as routed through the PMs 610 and 612 on the server 600. Discussing in more detail the PMBUS communication represented by bidirectional arrows 626 and 628, and the predefined number and/or identifier (e.g. a throttle pin or another predefined number in accordance with present principles) communication represented by bidirectional arrows 630 and 632, it is to be understood that while in some embodiments the server 602 may be directly communicatively coupled to the server 604, in the example shown PMBUS and throttle pin communication is routed through the PMs 610 and 612 of the server 600 to be received from the respective PMs on the servers 602 and 604. More detail on these types communications will be provided below. Regardless, it is to be understood that these types of communications may be undertaken by the servers of FIGS. 4 and 5 as well, although not specifically described above.

Still in reference to FIG. 6, it is to be understood that both electrical (e.g. power) and informational (e.g. PMBUS and throttle pin communication) may occur over direct lines and/or bus bars routing power (e.g. directly, rather than at the "rack lever") from one of the PMs shown to another of the PMs shown in accordance with present principles. Moreover, it is to be understood that the servers 600-604, when connected via respective PMs as shown in FIG. 6, establish collective N+1 redundancy to share power among the servers 600-604 e.g. should one of the PSUs on one of the servers malfunction.

Now describing the communications referenced herein in more detail, and without reference to any particular figure, it is to be understood that in at least some embodiments, for a power to be shared between servers, PMBUS communication may be used between the PMs of the respective servers. PMBUS communication may support functions such as PSU enable, EPOW, fan fail, etc. In any case, PMBUS communication can be achieved by routing via a PMBUS(s) from one server to the other server sharing power. When multiple (e.g. three or more) servers are connected through PMBUS, a multiplexer may be included in each PM engaging in communication so that one PM can communicate to and with plural other PMs.

In addition, a PSU-dedicated throttle pin, throttle number, or another predefined and/or system administrator defined number may be routed from one server to the next via the PMs. Such numbers will collectively be referred to below as the "throttle pin" for simplicity. The throttle pin may first be transmitted as a direct connect and/or communication from a PSU to a PM to indicate a critical PSU condition at the PSU, such an over-current condition or over-temperature condition, which needs to be quickly managed (e.g. by one or more of the servers) to prevent shutdown of that PSU and/or to prevent unavailability of one or more of the servers, it being recognized herein that in at least some instances, PMBUS communication, particularly in embodiments with three or more servers, may be slower (e.g. cause timing and/or communication issues on the bus) than (e.g. direct) communication of the throttle pin. Thus, a PM in accor dance with present principles may in some instances, using e.g. integrated logic, emulate the functions of the PMBUS communication to the BMC (and/or another controller) of the server having the PM. In any case, a throttle pin may generally be received at a first PM from a second PM (where the second PM received it from a PSU on the server having the second PM), and communicated from the first PM to one or more of a FPGA and/or CPU) on the server having the first PM, which can quickly (e.g. in 10 µs) cause CPU activation and/or power to decrease.

Figure 7:
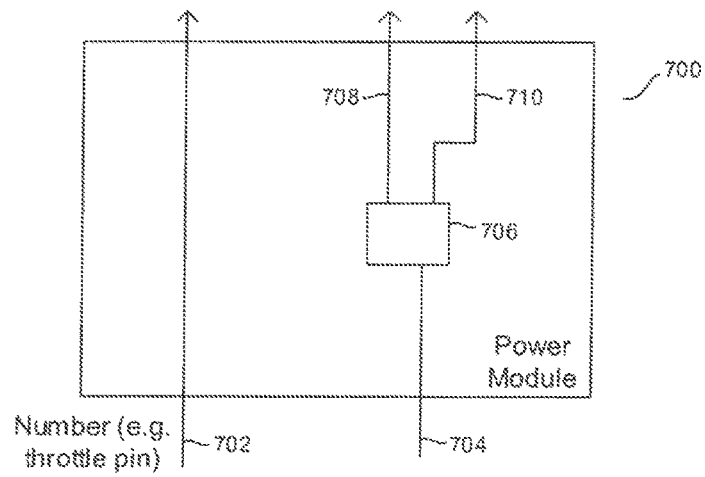
FIG. 7 is an illustration of at least, a portion of the communication described herein.

Thus, an example PM 700 is shown in FIG. 7, which is understood to route incoming power from another PM (not shown) on another server into the server which houses the PM 700. The PM 700 may even in some embodiments emulate PMBUS commands to its BMC when (e.g. only) receiving power from another servers PM and not from a PSU of that server itself, and/or when there is too much traffic in the "pipe" at a given moment for actual PMBUS communications between the servers to be made. The PM 700 may (e.g. constantly and/or at intervals) receive a throttle pin via path 402 from a PM on another server and route it directly through the PM 700 to the server's CPLD, PPGA, and/or BMC ("the server" understood to be referencing the server on which the PM 700 is disposed), it being understood that when a PSU malfunction occurs at another server, an (e.g. false and/or predefined) assertion (and/or another notification or pulling high or low of the throttle pin e.g. as defined by a system administrator), and/or data associated with the assertion, may also be routed via the path 702 to the servers CPLD, PPGA, and/or BMC to indicate a PSU malfunction for which power and/or resource consumption is to be managed at the server in response.

Still in reference to FIG. 7, note that a single power in path 704 for power from a PM on another server and for PMBUS communication from the PM on the other server is shown as entering an example power management logic element 706 (e.g. BIOS, hard-wired logic, etc.) on the PM. The element 706 then splits the power and PMBUS communication into two, routing the power via path into the server, and, using path 710, one or both of allowing PMBUS communication from a PM on another server to pass therethrough to the CPLD, FPGA, and/or BMC, and emulating PMBUS commands to the CPLD, FPGA, and/or BMC so that the CPLD, FPGA, and/or BMC e.g. function as if power was being received from a PSU on the server itself until actual PMBUS communication can be received due to e.g. traffic congestion and/or lack of capacity on the PMBUS communication line between the servers. However, note that in some embodiments, if desired, no emulation may be executed but instead the server may perform PMBUS communication when possible despite e.g. timeout issues on the line.

Regardless, in either case, owing to throttle pin assertion data communication via path 702 generally occurring faster, the CPLD, FPGA, and/or BMC may be informed of the PSU malfunction relatively faster than via the PMBUS communication shown. Once the BMC receives and/or identifies the (e.g. false) assertion, the BMC and/or another processor on the server (e.g. the main CPU, as informed e.g. by the BMC) may reduce power and performance level so as to reduce its power consumption and not e.g. go offline, malfunction, and/or consume so much power so as to not leave enough for other servers also relying on the power to continue functioning at some level until an administrator can address the problem with the malfunctioning PSU. Then, once the BMC determines that the throttle pin assertion is no longer occurring, the server may resume its previous operation level.

Figure 8:
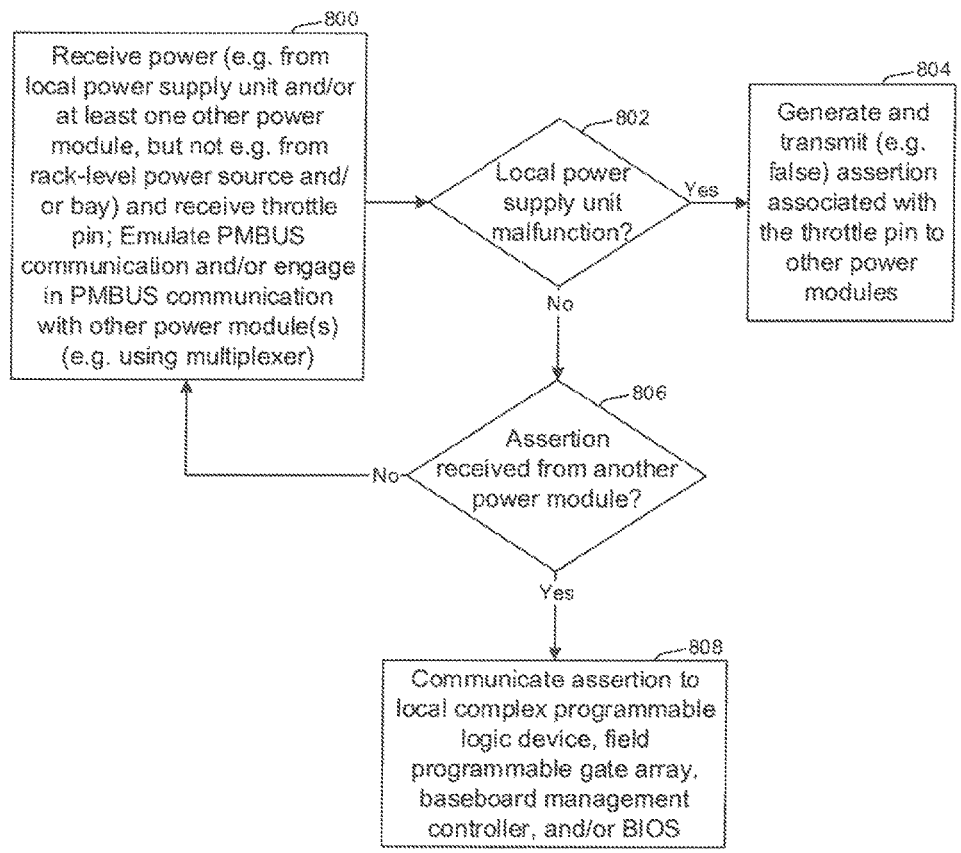
FIGS. 8 and 9 are flow charts showing example algorithms in accordance with present principles.

Continuing the detailed description now in reference to FIG. 8, it shows example logic that may be undertaken by a power module (e.g. by a processor therein, and/or by "hard-wired" logic therein) in accordance with present principles. The logic begins at block 800, where the logic receives power and a throttle pin (e.g. repetitively) from a local power supply unit and/or from a PM on another server, it being understood that power in example embodiments is not received from a "rack-level" power source and/or power bay. Also at block 800, the logic may emulate PMBUS communication, and/or actually engage in PMBUS communication, with other PMs (e.g. using a multiplexer, if desired).

After block 800 the logic proceeds to decision diamond 802 where the logic determines whether there is a PSU malfunction (e.g. a power failure, an overheating condition, etc.) of a PSU on the server of the PM undertaking the present logic (e.g. a "local" PSU). An affirmative determination at diamond 802 causes the logic to proceed to block 804 where the logic generates and transmits (e.g. false and/or predefined) assertion data for the throttle pin to other PMs as discussed herein so that the other servers may adjust their functions accordingly. However, a negative determination at diamond 802 may cause the logic to proceed to decision diamond 806, where the logic determines whether assertion data from another PM has been identified.

A negative determination at diamond 806 causes the logic to proceed back to block 800 and proceed therefrom. However, an affirmative determination thereat causes the logic to proceed to block 808 (it being understood that in other embodiments no determination per se need be made, but instead upon receipt and/or identification of assertion data the logic may proceed e.g. from block 800 directly to block 808). At block 808 the logic communicates the assertion data at least to the CPLD and/or FPGA (if not directly to the BMC), where the CPLD and/or FPGA may in turn pass on the assertion data and/or an indication thereof the server's BMC so that power may be managed (e.g. down) accordingly.

Figure 9:
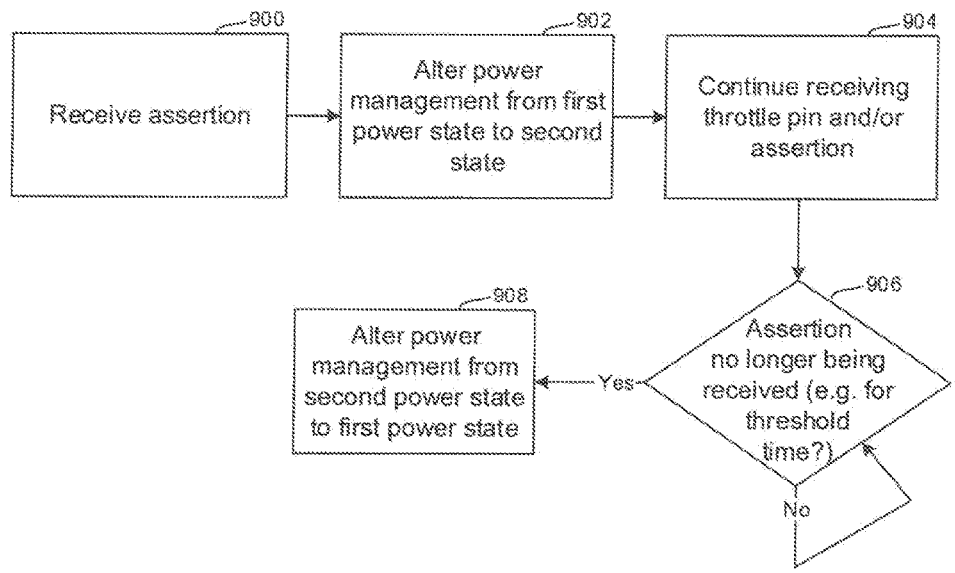

Reference is now made to FIG. 9, which shows example logic that may be undertaken by a BMC, BIOS, and/or another service processor in accordance with present principles. At block 900, the logic receives assertion data as disclosed herein (e.g. from a CPLD on the same server). Responsive to receipt of the assertion data, the logic proceeds to block 902 where the logic alters power consumption and/or power management of the server, and/or at least notifies another processor on the server such as the main CPU to do so, from a first (e.g. relatively higher consumption) power (e.g. management) state to a second (e.g. relatively lower consumption) power (e.g. management) state. Thereafter, the logic moves to block 904 where it continues receive the throttle pin and/or throttle pin (e.g. false) assertion data.

From block 904 the logic moves to decision diamond 906 where the logic determines whether the (e.g. false) assertion no longer exists. In some embodiments, the determination whether the (e.g. false) assertion no longer exists may specifically be whether it no longer exists (and/or whether data related thereto is no longer received) for a threshold time (e.g. as set by a system administrator). A negative determination at diamond 906 (e.g. a determination that the assertion still exists) causes the logic to continue making the determination thereat, until an affirmative determination is made. Then, responsive to an affirmative determination at diamond 906 (e.g. such as may occur when the assertion no longer exists owing to an administrator fixing a malfunction with a given PSU), the logic proceeds to block 908 where the logic alters power management from the second power (e.g.

management) state to another power (e.g. management) state (e.g. back to the relatively higher first power management state).

Without reference to any particular figure, it is to be understood that PSUs in accordance with present principles may be e.g. 110 volt PSUs and/or 210 volt PSUs which receive power from a power outlet and provide it to a PM.

Also without reference to any particular figure, it is to be understood that a PSU throttle number may in some embodiments be routed from the PM to a CPLD on the same server, while in other embodiments it may be routed from the PM directly to the BMC hardware, and/or routed indirectly through connects between the BMC hardware and CPLD. Moreover, the source of what will cause a throttle number assertion may be defined (e.g. have its "values" set) by system administrators or the servers described herein e.g. to meet the server system's needs (e.g. defined as AC loss, power cord no longer engaged with outlet, early power off, an over-temperature condition, and/or an overcurrent condition, etc.). Once the throttle number is "asserted," the PMBUS can be used to query the source for which event is causing the PSU throttle number to be asserted and an action may be taken (e.g. by the BMC) accordingly.

Still without reference to any particular figure, BIOS as disclosed herein may be a set of routines stored in read-only memory that enable a computer (e.g. server) to start an operating system and to communicate with the various devices in a system, such as disk drives, keyboard, monitor, printer, and communications ports. In one embodiment, functions performed by BIOS may also be performed by other higher level software application programs. In another embodiment, BIOS may be a Unified Extensible Firmware Interface (UEFI), which assists in control handoff of a computer system to an operating system during a pre-boot environment (e.g., after the computer system is powered on, but before the operating system starts).

Even further, it is to be understood that although this detailed description often discloses things in reference specifically to servers, present principles may also be applied e.g. between personal computers and the other types of computers described herein (e.g. laptop computers, desktop computers, etc.).

It may now be appreciated that, present principles provide for e.g. allowing power delivery for server deployments using power from PSUs (e.g. PSU unit types with the same form factor and interconnect) which provide power directly to the server via the servers PM and/or from PSUs on other servers as disclosed herein without e.g. large scale power sharing at the server rack level.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a transitory signal and/or a signal per se.

While the particular SUPPLY OF POWER FROM ONE DEVICE TO ANOTHER DEVICE is herein shown and described in detail, it is to be understood that the subject matter which is encompassed by the present application is limited only by the claims.

What is claimed is:

1. A first server, comprising:
a baseboard management controller (BMC);
at least a first power module (PM) which at least receives at least some power from a second PM on a second server different from the first server; and
a circuit which facilitates communication between the first PM and the BMC on the first server;
wherein the first PM identifies an assertion, which is associated with a number, from the second PM and communicates the assertion to the circuit, wherein in response to identification of the assertion the circuit communicates data pertaining to the assertion to the BMC, and wherein the BMC in response to receipt of the data alters power management of the first server from a first power state to a second power state different from the first power state; and
wherein the first PM provides at least some power from the second PM to a third PM on a third server different from the first server and the second server, and wherein the first PM provides at least some power from the third PM to the second PM.

2. The first server of claim 1, wherein the assertion is a false assertion.

3. The first server of claim 1, wherein the number is a predefined number associated with at least one power supply unit (PSU).

4. The first server of claim 1, wherein the number is a throttle pin.

5. The first server of claim 1, wherein the circuit is one or more of: a programmable logic device (PLD), a complex programmable logic device (CPLD), a field programmable gate array (FPGA), a microcontroller, and a sub-processor.

6. The first server of claim 1, comprising a first power supply unit (PSU), wherein the first PM provides at least some power from the first PSU to the second PM.

7. The first server of claim 1, comprising a multiplexer, and wherein the first PM communicates with the second PM and the third PM at least in part using the multiplexer.

8. The first server of claim 1, comprising a first power supply unit (PSU), wherein the first PM provides at least some power from the first PSU to at least the third PM.

9. The first server of claim 8, wherein the first PM provides at least some power from the first PSU to the third PM and to the second PM.

10. The first server of claim 1, wherein the first PM receives at least some power from the third PM.

11. The first server of claim 1, wherein the first PM receives at least some power from the second PM through one or more of: a direct line from the second PM, and a bus bar.

12. The first server of claim 1, wherein the BMC manages the first server in the second power state until the BMC stops identifying the assertion for a threshold amount of time, and wherein the BMC, in response to no longer identifying the assertion for the threshold amount of time, alters power management of the first server from the second power state to one of the first power state and a third power state different from the second power state.

13. The first server of claim 1, wherein the first server does not receive power from a rack-level power source independent of a server, and wherein the first server does not receive power from a power bay independent of a server.

14. The first server of claim 1, wherein the first PM communicates with the second PM at least using power management bus (PMBUS) communication.

15. The first server of claim 1, wherein the first PM emulates power management bus (PMBUS) commands to one or more of: the circuit, and the BMC.

16. A method, comprising:
facilitating connection of a first power module (PM) of a first server to a second PM of second server, the connection of the first PM to the second PM at least in part establishing the supply of at least backup power from the second PM to the first PM; and
facilitating connection of the first PM to a third PM of a third server, the connection of the first PM to the third PM at least in part establishing the supply of at least backup power from the first PM to the third PM;
wherein the first PM provides at least some power from the second PM to the third PM, and wherein the first PM provides at least some power from the third PM to the second PM; and
wherein the first PM identifies an assertion from the second PM and communicates the assertion to a circuit of the first server, wherein in response to identification of the assertion the circuit communicates data pertaining to the assertion to a controller of the first server, and wherein the controller in response to receipt of the data alters power management of the first server from a first power state to a second power state different from the first power state.

17. The method of claim 16, wherein the connection of the first PM to the second PM, and the connection of the first PM to the third PM, establish collective N+1 redundancy for the first server, the second server, and the third server.

18. The method of claim 16, comprising:
facilitating connection of the first PM to a first power supply unit (PSU) on the first server, wherein the first PSU at least in part powers the first server; and
facilitating operation of the first PM to provide a notification associated with a PSU malfunction to the second PM and the third PM responsive to a malfunction of the first PSU.

19. A first device, comprising:
at least one processor,
storage;
a power supply unit (PSU) interface which connects to a PSU and receives power from the PSU;
a first power module (PM) comprising a power in interface for receiving power from at least one computer and a power out interface for providing power to at least one computer; and
a circuit which facilitates communication between the first PM and the at least one processor;
wherein the first PM identifies an assertion from a second PM of a second device different from the first device and communicates the assertion to the circuit, wherein in response to receipt of the assertion the circuit communicates data pertaining to the assertion to the at least one processor, and wherein the at least one processor in response to receipt of the data alters power management of the first device from a first power state to a second power state different from the first power state; and
wherein the first PM provides at least some power from the second PM to a third PM of a third device different from the first device and the second device, and wherein the first PM provides at least some power from the third PM to the second PM.

20. The first device of claim 19, wherein the PM manages power from the PSU and power from at least one computer while connected thereto, and wherein responsive to a malfunction of the PSU while the PSU is connected to the PSU interface, the PM generates a notification to at least one computer.

21. The first device claim 20, wherein the assertion is a first assertion, wherein the notification comprises a second assertion, and wherein the first device communicates the second assertion to the at least one computer.

22. A method, comprising:
providing a controller of a first device;
providing at least a first power module (PM) of the first device, wherein the first PM at least receives at least some power from a second PM of a second device different from the first device; and
providing a circuit of the first device which facilitates communication between the first PM and the controller of the first device;
wherein the first PM identifies an assertion from the second PM and communicates the assertion to the circuit, wherein in response to receipt of the assertion the circuit communicates data pertaining to the assertion to the controller, and wherein the controller in response to receipt of the data alters power management of the first device from a first power state to a second power state different from the first power state; and
wherein the first PM provides at least some power from the second PM to a third PM of a third device different from the first device and the second device, and wherein the first PM provides at least some power from the third PM to the second PM.

23. The method of claim 22, wherein the assertion is a false assertion.

* * * * *